MAGNETIC RECORDING AND REPRODUCING SYSTEM

Filed April 23, 1962 3 Sheets-Sheet 1

INVENTOR.
Kenjiro Takayanagi,
BY
Pierce, Scheffler & Parker
his Attorneys

Jan. 18, 1966 KENJIRO TAKAYANAGI 3,230,306

MAGNETIC RECORDING AND REPRODUCING SYSTEM

Filed April 23, 1962 3 Sheets-Sheet 2

INVENTOR.
BY Kenjiro Takayanagi,
Pierce, Scheffler & Parker
his Attorneys

MAGNETIC RECORDING AND REPRODUCING SYSTEM

Filed April 23, 1962 3 Sheets-Sheet 3

INVENTOR.

Kenjiro Takayanagi,

BY Pierce, Scheffler & Parker his Attorneys 3,230,306
Patented Jan. 18, 1966

3,230,306

MAGNETIC RECORDING AND REPRODUCING SYSTEM

Kenjiro Takayanagi, Kanagawa-ku, Yokohama, Japan, assignor to Victor Company of Japan Limited, a corporation of Japan Filed Apr. 23, 1962, Ser. No. 189,498
Claims priority, application Japan, May 18, 1961, 36/17,744
5 Claims. (Cl. 178—6.6)

This invention relates to a magnetic recording and reproducing system for such wide band signals as, for example, television video signals.

An object of the present invention is to provide an excellent recording and reproducing system wherein wide frequency bands can be recorded and reproduced with little amplitude distortion and phase distortion.

In the conventional system of this purpose, an FM system has been normally used. There has been used a residual side-band wherein the carrier frequency in FM is set at a certain frequency close to the highest frequency in modulating frequency range and a lower side-band is utilized by selecting the carrier frequency close to the upper limit of the recording and reproducing frequency range.

However, in such system, in case a reproduced signal is taken out through a frequency discriminator, as the lower side-band is utilized, there will be caused the following various defects:

(1) For example, as the higher frequencies in a recording signal or a video signal are recorded in lower frequency range than the carrier frequency, recorded characteristics will greatly deteriorate.

(2) In reproduction, in case the picked-up signal by magnetic heads is passed directly through the frequency discriminator (as is usually the case), as the carrier frequency is so high as to be easily filtered out with a low-pass filter. In this point, it is very favorable. But, on the other hand, as the signal part corresponding to higher frequencies in the video signal is in the low-frequency range and it pass as it is, therefore the signal before being discriminated will tend to strongly mix and remain in the detected signal causing dots in the reproduced picture.

The above defects will appear remarkably in recording and reproducing color video signals when the chrominance signal sub-carrier of 3.58 mc. is strong. That is to say, if the FM carrier is 6 mc., the sub-carrier of 3.58 mc. will be recorded and reproduced with a center of 6 mc.−3.58 mc.=2.42 mc. and will appear on the picture without being well filtered. Further, not only this sub-carrier but also the multiplied frequency of this frequency or any other frequency will mix into the video signal, will form beats with the video signal and will stain the picture.

The present invention is to eliminate the above described defects and disadvantages.

The present invention shall be detailed in the following with reference to the respective embodiments in the drawings.

FIGURES 1 to 5 of the drawings are explanatory views for explaining the principle of the system of the present invention.

Figure 1:
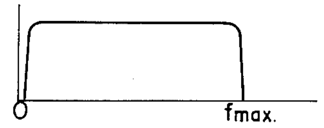
Figure 2:
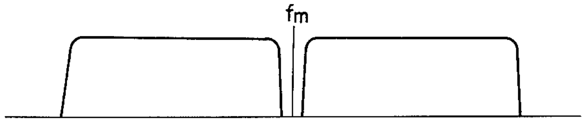
Figure 3:
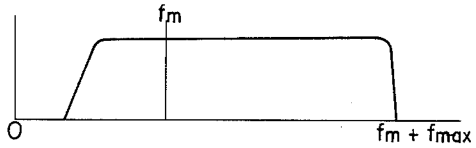
Figure 4:
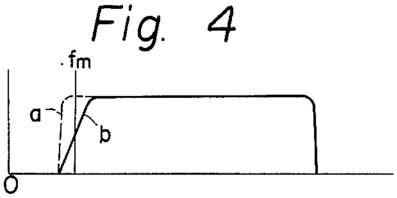
Figure 5:
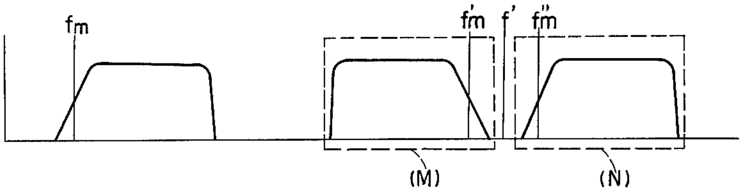
Figure 6:
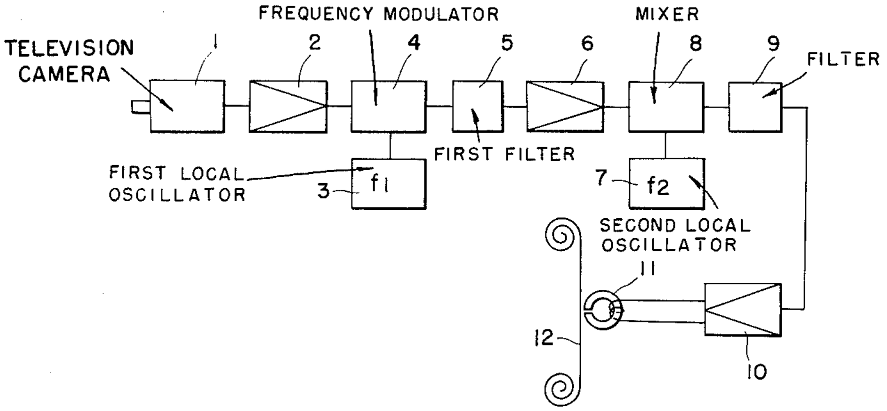
FIGURE 6 is a block diagram of a recording apparatus embodying the system of the present invention.

First of all, the principle of the system of the present invention shall be explained. A carrier frequency $f_m$ lower than the maximum frequency $f_{max}$ of a desired recorded signal shown in FIGURE 1 is modulated as shown in FIGURE 2 by this predetermined recording signal. In such case, if a relatively small frequency deviation is used, the carrier frequency is taken to be lower than the maximum frequency $f_{max}$ of the wide band signal to be recorded and reproduced as shown in FIGURE 3 and yet the above mentioned carrier frequency $f_m$ is set close to the lower limit of the above mentioned band so that a residual side-band recording and reproducing system utilizing the upper side-band may be made, the frequency characteristics will be as shown in FIGURE 4. In case the thus obtained signal (*a* or *b* in FIGURE 4) is to be recorded on a magnetic medium by any method and the recorded signal is to be reproduced, the reproduced signal obtained from the above mentioned magnetic medium will be shifted to a higher frequency, for example, a frequency $f'$ by a heterodyne or any other method as shown in FIGURE 5 and the signal M or N will be demodulated to the original video signal by means of a frequency discriminator. In FIGURE 6 is shown an embodiment of the apparatus wherein is applied a magnetic recording and reproducing system based on the above mentioned principle. In the drawing, 1 is a television camera. 2 is a video amplifier. 3 is the first local oscillator of a frequency $f_1$. 4 is a frequency modulator. 5 is the first filter. 6 is an amplifier. 7 is the second local oscillator of a frequency $f_2$. 8 is a mixer. 9 is a filter. 10 is an amplifier. 11 is a recording magnetic head. 12 is a magnetic tape.

Figure 7:
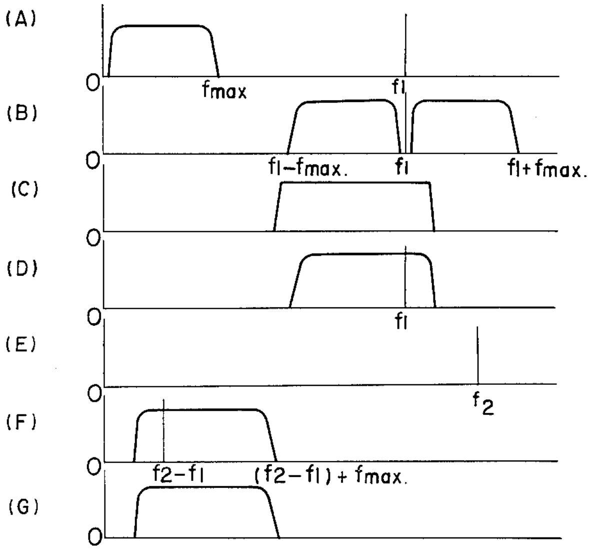
FIGURE 7 is an explanatory view of the operation of the same.

The operation shall now be explained. First, if a video signal with the maximum frequency $f_{max}$ obtained in the television camera 1 has such frequency band as is shown, for example, in A in FIGURE 7, it has frequency-modulated as shown in B by means of the first local oscillator 3 of the frequency $f_1$ and the frequency modulator 4, and is then filtered by means of the filter 5 having such characteristics as are shown in C, a signal of such frequency band as is shown in D in FIGURE 7 will be obtained. Then, if this signal is heterodyned by means of the second local oscillator 7 of the frequency $f_2$ and the mixer 8 so as to have the frequency reduced, such recorded signal as is shown in F in FIGURE 7 will be obtained. Its frequency band will be as shown in G. By the way, if it is heterodyned with a proper frequency, for example, $f_2$ so as to have the frequency reduced, the beats will not be produced from the high frequency of the video signal and it will be therefore favorable. Further, when the carrier has the frequency reduced to be lower than $f_{max}$ with the above mentioned frequency $f_2$, if both side-bands coexist, they will be in the way. Therefore, there is made a residual side-band system wherein only the lower side-band is filtered by means of the above mentioned first filter 5 so as to be a residual side-band and thereby a form of an upper side-band is rather utilized for the recorded signal. The above embodiment has been described for the case of $f_2>f_1$. However, it is also possible for the case of $f_2<f_1$. It is needless to say that, in the latter case, the first filter 5 may be of such characteristics as will filter a side-band reverse to that in the former case.

Figure 8:
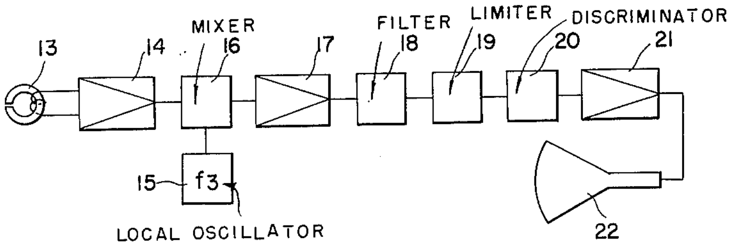
FIGURE 8 is a block diagram of a reproducing apparatus of the same.

Needless to say, the thus obtained recorded signal is recorded on the magnetic tape 12 by means of the recording magnetic head 11. In reproducing the thus recorded signal, the following measures are taken. First of all, in FIGURE 8, 13 is a reproducing head. 14 is an amplifier. 15 is a local oscillator of a frequency $f_3$. 16 is a mixer. 17 is an amplifier. 18 is a filter. 19 is a limiter. 20 is a discriminator. 21 is a video amplifier. 22 is a picture tube.

Figure 9:
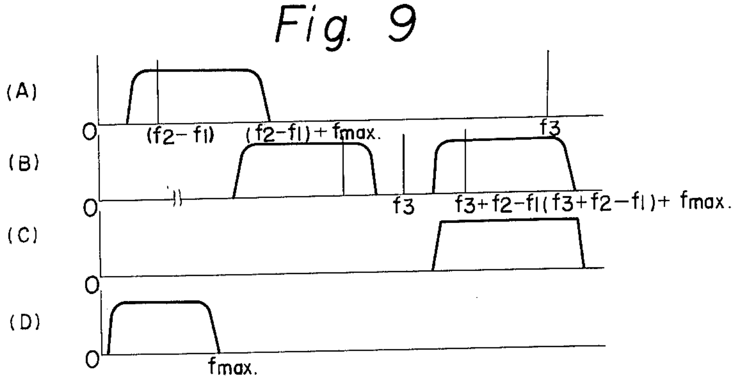
FIGURE 9 is an explanatory view of the operation of the same.

The operation shall now be explained. When the signal (shown in A in FIGURE 9) picked up by the reproducing head 13 from the magnetic tape 12 is heterodyned by means of the local oscillator 15 of the frequency $f_3$ and the mixer 16 and is shifted to higher frequencies as shown in B in FIGURE 9 and the thus obtained signal, for example, the upper side-band is filtered by means of the filter 18 or the like, is passed through the limiter 19 and is applied to the discriminator 20, a reproduced signal shown in D will be obtained. It is desirable to use quartz oscillators or the like of stable oscillation frequencies for the local oscillators used for modulation in the above mentioned various parts.

Figure 10:
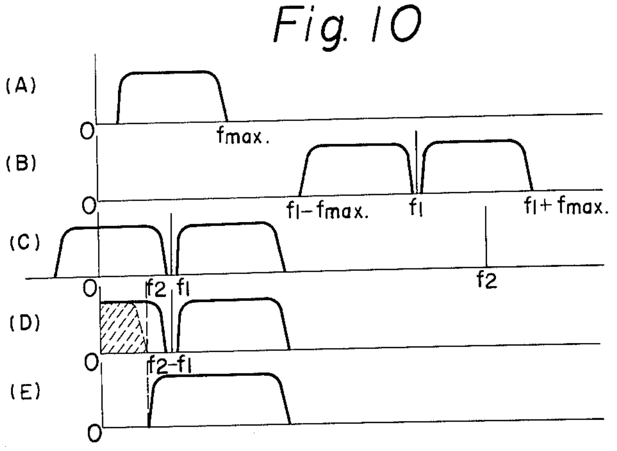
FIGURE 10 is an explanatory view of the operation on the recording end of another embodiment.

The second embodiment of the present invention shall now be explained. As the formation of this embodiment is substantially identical with that of the above embodiment, the systematic explanation of the recording end of this apparatus shall be made with reference to FIGURE 6. First, when the signal (shown in A in FIGURE 10) obtained by a television camera has frequency-modulated, it will become a signal of such band as is shown in B in FIGURE 10. It is then heterodyned as it is with the frequency $f_2$ and is shifted to the position shown in C in FIGURE 10. Therein the lower side-band is shown to project partly into the negative side. However, it is to make the explanation easy. In fact, as shown in D, the part projecting into the negative side will be as folded back. When this signal is amplified with such amplifier as will not amplify the above mentioned folded back part, a signal (shown in E) to be recorded will be obtained. It will be recorded on the magnetic tape and will be reproduced. The method of reproducing it is the same as in the above mentioned first embodiment and therefore the explanation thereof shall be omitted.

Thus, as compared with the above mentioned conventional system, the system of the present invention has such excellent features as are in the following:

(1) The high signal part of a recorded signal is recorded with such high frequencies that the amplitude and phase will be little distorted and therefore a high quality reproduced signal can be obtained.

(2) The carrier is selected to be so close to the lower limit of the band of the recorded and reproduced signal that the band can be effectively utilized and the frequency band of the reproduced signal can be taken to be wider than in the conventional system.

As detailed in the above, the present invention is characterized in that, in a magnetic recording and reproducing system for recording and reproducing television video signals or any other wide band signals by modulating their frequencies, the modulated frequency is selected to be substantially equal to or lower than the maximum frequency of the recorded and reproduced signal and is set close to the lower limit of the recording and reproducing frequency range. Thus, the expected object has been attained.

In the above embodiments, the recording and reproduction of television video signals have been explained. However, it is needless to say that no only such video signals but also any other proper signals can be recorded and reproduced. Further, various other devices than those used in the above embodiments can be employed in such recording and reproduction. It is also needless to say that the present invention can be worked as properly modified without deviating from the spirit of the invention.

What I claim is:

1. A magnetic recording and reproducing method for recording and reproducing television video signals or any other wide-band signals on a magnetic medium characterized by frequency-modulating a carrier of relatively higher frequency with a signal to be recorded, then heterodyning the modulated signal against a fixed frequency signal so as to give a frequency-shift and to set a center frequency of the frequency-deviation in the carrier substantially equal to or lower than the maximum frequency of the signal to be recorded, recording the frequency-deviated signal on a magnetic medium and reproducing the recorded signal by demodulating after picking up the signal from the magnetic medium.

2. A magnetic recording and reproducing method for recording and reproducing television video signals or any other wide-band signals on a magnetic medium characterized by frequency-modulating a carrier of relatively higher frequency with a signal to be recorded to produce a frequency-modulated signal having two side bands, filtering the frequency-modulated signal to remove a portion of one side band thereof, then heterodyning the modulated signal against a fixed frequency signal so as to give a frequency-shift and to set a center frequency of the frequency-deviation in the carrier substantially equal to or lower than the maximum frequency of the signal to be recorded and to place said one side band at the lower end of the spectrum of the frequency-deviated signal, recording the frequency-deviated signal on a magnetic medium and reproducing the recorded signal by demodulating after picking up the signal from the magnetic medium.

3. A magnetic recording and reproducing method for recording and reproducing television video signals or any other wide-band signals on a magnetic medium characterized by frequency-modulating a carrier of relatively higher frequency with a signal to be recorded, then heterodyning the modulated signals against a fixed frequency signal so as to give a frequency-shift and to set a center frequency of the frequency-deviation in the carrier substantially equal to or lower than the maximum frequency of the signal to be recorded and further by setting the lower limit of the said frequency-deviation in the carrier as low as possible in the magnetically recordable and reproduceable range, recording the frequency-deviated signal on a magnetic medium and, reproducing the recorded signal by demodulating after picking up the signal from the magnetic medium.

4. A magnetic recording and reproducing method for recording and reproducing television video signals or any other wide-band signals on a magnetic medium characterized by frequency-modulating a carrier of relatively higher frequency with a signal to be recorded, then heterodyning the modulated signal against a fixed frequency signal so as to give a frequency-shift and to set a center frequency of the frequency-deviation in the carrier substantially equal to or lower than the maximum frequency of the signal to be recorded, recording the frequency-deviated signal on a magnetic medium, picking up the recorded signal from the magnetic medium, heterodyning again the picked-up signal against another fixed frequency signal so as to give another frequency-shift, and demodulating the deterodyned signal to reproduce the original signal.

5. In a magnetic recording system for recording television video signals or any other wide-band signals on a magnetic medium, oscillator means producing a first signal at a first frequency, first modulator means for modulating the frequency of said oscillator means, means for applying an input signal to said modulator means to frequency modulate said first signal and to produce a first frequency modulated carrier signal, said input signal having a frequency range extending from a relatively low frequency to a certain maximum frequency with said first frequency being substantially higher than said certain maximum frequency, means for generating a second signal at a second frequency differing from said first frequency by a frequency less than the sum of said certain maximum frequency and the maximum deviation of the frequency of said first frequency modulated carrier away from said first frequency, mixer means responsive to said first frequency modulated carrier signal and said second signal to produce by heterodyne action a second frequency modulated carrier signal having a center frequency substantially equal to or lower than said certain maximum frequency, and magnetic recording means operative to record said second frequency modulated signal on a magnetic medium, said magnetic recording means having a frequency response characteristic with a maximum frequency at least as high as the upper frequency limit of said second frequency modulated carrier signal.

References Cited by the Examiner

UNITED STATES PATENTS

| | | | |
|---|---|---|---|
| 2,499,279 | 2/1950 | Peterson | 332—45 X |
| 2,956,114 | 10/1960 | Ginsburg | 178—6.6 |
| 3,040,125 | 6/1962 | Dillenburger | 178—6.6 |

DAVID G. REDINBAUGH, *Primary Examiner.*

ROBERT SEGAL, *Examiner.*

J. C. LAWSON, H. W. BRITTON, *Assistant Examiners.*